United States Patent
Grimm et al.

(10) Patent No.: US 10,532,844 B2
(45) Date of Patent: Jan. 14, 2020

(54) THERMOFORM PACKAGING MACHINE WITH PULLING DEVICE

(71) Applicant: MULTIVAC Sepp Haggenmüller SE & Co. KG, Wolfertschwenden (DE)

(72) Inventors: Bernhard Grimm, Kempten (DE); Thomas Müller, Westerheim (DE)

(73) Assignee: MULTIVAC SEPP HAGGENMÜLLER SE & CO. KG, Wolfertschwenden (DE)

( * ) Notice: Subject to any disclaimer, the term of this patent is extended or adjusted under 35 U.S.C. 154(b) by 22 days.

(21) Appl. No.: 15/820,298

(22) Filed: Nov. 21, 2017

(65) Prior Publication Data

US 2018/0141693 A1  May 24, 2018

(30) Foreign Application Priority Data

Nov. 23, 2016 (DE) ................. 10 2016 122 625

(51) Int. Cl.
| | |
|---|---|
| B65B 59/02 | (2006.01) |
| B65B 41/14 | (2006.01) |
| B29C 51/18 | (2006.01) |
| B65B 9/04 | (2006.01) |
| B65B 41/12 | (2006.01) |
| B65B 61/00 | (2006.01) |
| B65B 57/00 | (2006.01) |
| B29C 51/26 | (2006.01) |
| B29L 31/00 | (2006.01) |

(Continued)

(52) U.S. Cl.
CPC ............ B65B 59/02 (2013.01); B29C 51/262 (2013.01); B29C 51/268 (2013.01); B65B 9/04 (2013.01); B65B 41/12 (2013.01); B65B 57/00 (2013.01); B65B 61/005 (2013.01); B29C 51/18 (2013.01); B29C 51/46 (2013.01); B29C 66/849 (2013.01); B29L 2031/712 (2013.01)

(58) Field of Classification Search
CPC .......... B65B 59/02; B65B 41/14; B65B 9/04; B29C 51/262; B29C 65/7841; B29C 51/18
See application file for complete search history.

(56) References Cited

U.S. PATENT DOCUMENTS

| | | | |
|---|---|---|---|
| 2015/0135650 A1 | 5/2015 | Lau et al. | |
| 2015/0367971 A1* | 12/2015 | Grimm | ............. B65B 31/021 53/453 |

FOREIGN PATENT DOCUMENTS

| | | |
|---|---|---|
| DE | 2437127 A1 | 2/1976 |
| DE | 3612096 A1 | 10/1987 |
| DE | 4216209 A1 | 11/1993 |

(Continued)

Primary Examiner — Mark A Osele
Assistant Examiner — Christopher C Caillouet
(74) Attorney, Agent, or Firm — Husch Blackwell LLP

(57) ABSTRACT

A thermoform packaging machine including a forming station, a sealing station, a cutting station and a film conveying unit. The film conveying unit includes a clamp chain arranged on a lateral edge of a bottom film, wherein the clamp chain cyclically conveys the bottom film in a direction of production during operation, the bottom film is advanced one cycle length in each cycle of the thermoform packaging machine. Further, the thermoform packaging machine may include a pulling device that pulls a pull section of the bottom film and/or a top film in a direction parallel to the direction of production relative to the lateral edge of the bottom film held by the clamp chain.

21 Claims, 5 Drawing Sheets

(51) Int. Cl.
*B29C 51/46* (2006.01)
*B29C 65/00* (2006.01)

(56) References Cited

FOREIGN PATENT DOCUMENTS

| | | |
|---|---|---|
| DE | 102008016243 A1 | 10/2009 |
| DE | 102008051026 A1 | 4/2010 |
| DE | 102011115881 A1 | 4/2013 |
| DE | 102012024725 A1 | 6/2014 |
| EP | 2740679 A1 | 6/2014 |

* cited by examiner

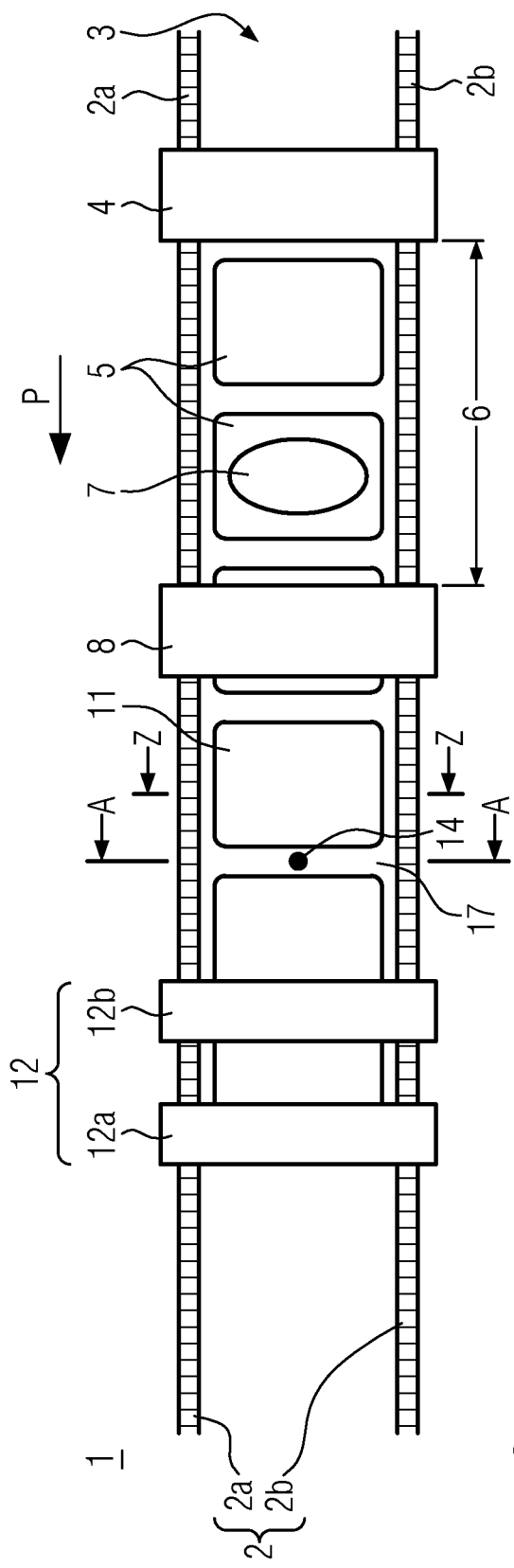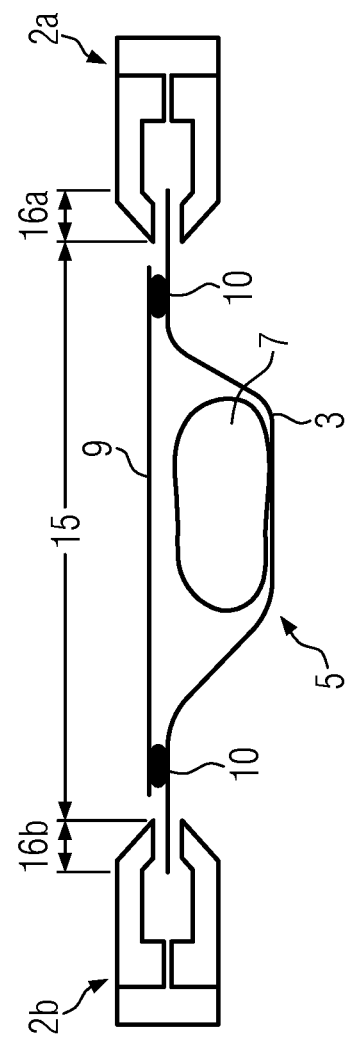

THERMOFORM PACKAGING MACHINE WITH PULLING DEVICE

CROSS-REFERENCE TO RELATED APPLICATIONS

This Application claims priority to German Patent Application No. DE 10 2016 122 625.4, filed on Nov. 23, 2016, to Bernhard Grimm and Thomas Müller, currently pending, the entire disclosure of which is incorporated herein by reference.

BACKGROUND OF THE INVENTION

Thermoform packaging machines are known such as that described in EP 2 740 679 A1. For increasing the positioning accuracy of the films during cutting or sealing, the cutting station as well as the sealing station can be displaced in a direction parallel to the direction of production. To this end, a reference element, whose position relative to a packaging trough is known, is detected and the cutting station or the sealing station is adjusted on the basis of the detected position of the reference element and of the packaging trough position known relative thereto. This adaptation is disadvantageous insofar as the position of the respective station can only be adjusted relative to the entire film.

In practice, it may happen that certain sections of the films are distorted relative to one another. This may be due to the product fed into the film trough. The larger the distance between the respective section and the normally used conveyor chains of the thermoform packaging machine is, the higher may be the degree of distortion. In addition, this effect may intensify with each cut carried out in the film compound before the packages are finally individualized. This film distortion may then lead to inaccuracies during sealing or cutting. It is the object of the present invention to provide a thermoform packaging machine that is improved with respect to the above-mentioned drawbacks.

SUMMARY OF THE INVENTION

According to the present invention, a thermoform packaging machine is provided, which comprises a forming station, a sealing station, a cutting station and a film conveying unit. The film conveying unit includes a clamp chain arranged on a lateral edge of a bottom film and used for cyclically conveying the bottom film in a direction of production, the bottom film being advanced in each cycle by one cycle length. The thermoform packaging machine according to the present invention may be characterized in that a pulling device is provided, which may be configured to pull, in a direction parallel to the direction of production, a pull section of the bottom film and/or of a top film relative to the lateral edge of the bottom film held by the clamp chain. One or a plurality of clamp chains may be provided; the film may here be gripped on only one edge by one or a plurality of clamp chains. Thermoform packaging machines in which each of the two lateral edges of a film may be respectively held by one or a plurality of clamp chains may be commonly used as well. In the following, the term lateral edge is to be understood as a margin area of a film/foil, which extends parallel to the direction of production. The term edge also relates to the surfaces of the film which may be inserted in clamps of the clamp chains.

An advantageous effect of the configuration according to the present invention resides in that a distortion in a pull section of the top film and/or bottom film, which may be not directly held by the clamp chain, can be compensated.

It will be advantageous when the pulling device may be arranged upstream of the sealing station or the cutting station at a distance corresponding to two cycle lengths at the most, preferably to not more than one or less than one cycle length. This may be advantageous in view of the fact that downstream of the pull section distortion may again occur, and the closer the pull section may be arranged to the sealing station or the cutting station, the smaller this distortion will be.

It may be conceivable that the pull section of the bottom film and/or of the top film extends outside the lateral edge of the bottom film held by the clamp chain. In the case of a variant in which two clamp chains may be provided for holding at opposed edges of the bottom film; it may be conceivable that the pull section extends between the lateral edges held by the clamp chain.

According to a possible variant, the pulling device comprises a clamping element and a counter-pressure bar, the clamping element being adapted to be pressed against the counter-pressure bar. The counter-pressure bar may be arranged e.g. below the bottom film and the clamping element may be arranged e.g. above the top film. A reversed mode of arrangement may be, however, conceivable as well. The counter-pressure bar and the clamping element may here be connected to one another by a bridge- or portal-shaped structure. Such a force-fit engagement variant has the advantage that no additional engagement features may be required at the film.

According to a particularly advantageous embodiment, the clamping element may be coated with silicone. In this way, the coefficient of friction between the film and the clamping element can be increased and the risk of slipping of the film can be reduced.

It will be advantageous when the clamping element, together with the counter-pressure bar, may be displaceable parallel to the direction of production by a displacement distance. In this way, pulling of the pull section can be enabled.

According to a variant, the clamping element and the counter-pressure bar may be displaceable by a pneumatically or hydraulically operated cylinder.

According to another variant, the clamping element and the counter-pressure bar may be displaceable by a stepping motor or a servomotor, preferably by means of a spindle or a crank.

According to a particularly advantageous embodiment, a distance sensor may be provided for detecting the displacement distance, the distance sensor preferably detecting the displacement distance directly. A direct detection of the displacement distance can be carried out using an optical or ultrasound-based distance sensor. An indirect detection of the displacement distance, e.g. by detecting the position of the stepping motor or the servomotor, is, however, conceivable as well.

It may be conceivable that the displacement distance may be controllable. This control may be of an electronic, mechanical, hydraulic or pneumatic type. This allows a particularly flexible adjustment of the displacement distance and, consequently, a flexible adaptation of the distortion correction. The displacement distance may be controllable, e.g. on the basis of the displacement distance detected by the distance sensor.

According to a further variant, a stop may be provided for limiting the displacement distance. A stop may be of advantage for a controllable displacement distance as well as for a non-controllable displacement distance. A system without a controllable displacement distance having a stop represents a particularly simple and robust variant.

According to a particularly advantageous embodiment, the clamping element may be adjustable in a direction perpendicular to the direction of production and preferably perpendicular to a clamping direction. The term clamping direction means here the direction in which the clamping element moves when it is pressed against the counter-pressure bar. It follows that an adjustment direction of the clamping element extends preferably in a plane parallel to the film plane and perpendicular to the direction of production.

According to a further variant, the pulling device may comprise a plurality of clamping elements, each of them adjustable preferably in a direction perpendicular to, the direction of production and preferably perpendicular to a clamping direction.

According to a particular the advantageous embodiment, a film distortion sensor may be provided, which may be configured for detecting a distortion of the pull section relative to the lateral edge of the bottom film held by the clamp chain. The film distortion sensor may e.g. be a camera capable of detecting e.g. the format of the troughs or the contours of the webs between the troughs. It is also conceivable to provide reference elements, such as print marks or holes, in the film, which may be detected by the film distortion sensor.

According to a possible variant, the pulling device may be configured for pulling between advancing phases of two cycles. Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show:

FIG. 1 is a schematic top view of one embodiment of a thermoform packaging in accordance with the teachings of the present disclosure;

FIG. 2 is a schematic section view of the thermoform packaging machine according to FIG. 1 cut along the line Z-Z;

DETAILED DESCRIPTION OF THE INVENTION

Figure 3:
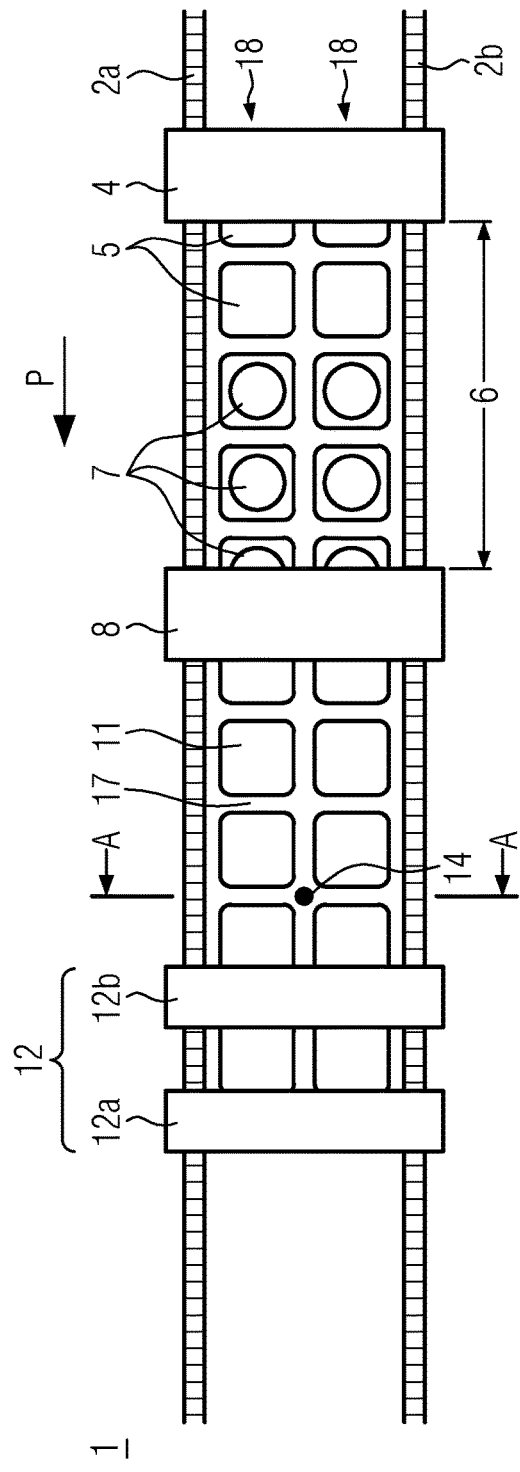
FIG. 3 is a schematic top view of one embodiment of a thermoform packaging in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

In FIG. 1 a top view of a thermoform packaging machine 1 is shown. In the present embodiment, the thermoform packaging machine 1 comprises a film conveying unit 2 with clamp chains 2a, 2b. The latter are configured for cyclically advancing a bottom film 3. As in the embodiment according to FIG. 1, two clamp chains 2a, 2b are provided in the following embodiments as well. It is, however, also conceivable to provide only a single clamp chain 2a (cf. FIG. 8), i.e. on only one side of the film 3.

The thermoform packaging machine 1 comprises a forming station 4. The forming station 4 is configured for forming troughs 5 in the bottom film 3. A loading track 6 is provided downstream of the forming station 4, when seen in a direction of production P. There, products 7 are put into the troughs 5. A sealing station 8 is arranged downstream of the loading track 6. The former is configured for sealing the troughs 5 by sealing a top film 9 onto them (cf. FIG. 2) and producing sealed seams 10 extending circumferentially around the troughs. In this way, sealed packages 11 are produced. The sealed packages 11 are advanced to a cutting station 12. In the present embodiment, this cutting station 12 comprises two cutting devices 12a, 12b. In principle, the present invention is, however, applicable to all kinds of cutting stations, preferably to those carrying out cuts, which are offset in the direction of production P and which extend transversely to the direction of production P. The sealed packages 11 can be fully individualized at the cutting station 12. Likewise, it is conceivable that the cutting station 12 only carries out certain cuts and that the packages are individualized further on downstream.

In FIG. 1, a pulling device 13 according to the present invention (cf. FIG. 5a-5c) is merely indicated by a clamping location 14. The latter is arranged in a pull section 15, which will be explained in more detail hereinafter making reference to FIG. 2. In FIG. 2, the clamp chains 2a, 2b are shown in the perspective identified by Z-Z in FIG. 1. The bottom film 3 is held by the clamp chains 2a, 2b at lateral edges 16a, 16b. The pull section 15 extends between those lateral edges 16a, 16b. Hence, this pull section 15 is the area of the bottom film 3 and of the top film 9 that is not covered and/or held by the clamp chains 2a, 2b.

With respect to the embodiment shown in FIG. 1, the clamping location 14 is arranged centrally in the pull section. Centrally means here in relation to a direction horizontally and transversely to the direction of production P. In the case of packages 11 or troughs 5 extending across the whole width of the pull section 15, the clamping location 14 should be arranged on a web 17 provided between the troughs 5. In general, the clamping location 14 should preferably be disposed on a web 17 arranged between troughs 5.

Figure 4:
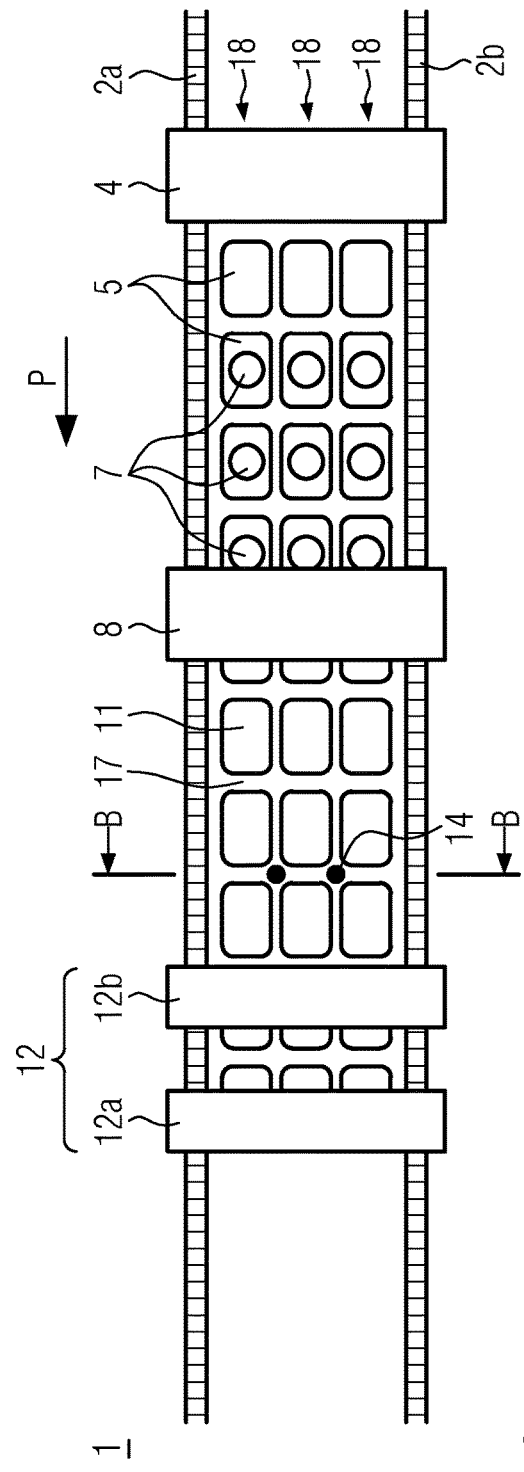
FIG. 4 is a schematic top view of one embodiment of a thermoform packaging in accordance with the teachings of the present disclosure.

As regards the fundamental structural design, the thermoform packaging machines 1 shown in FIGS. 3 and 4 mainly differ from the thermoform packaging machine 1 shown in FIG. 1 in that a different number of tracks 18 of troughs 5 is formed in the bottom film 3. This is merely intended to illustrate that the present invention is also applicable to this kind of thermoform packaging machines 1.

Figure 5A:
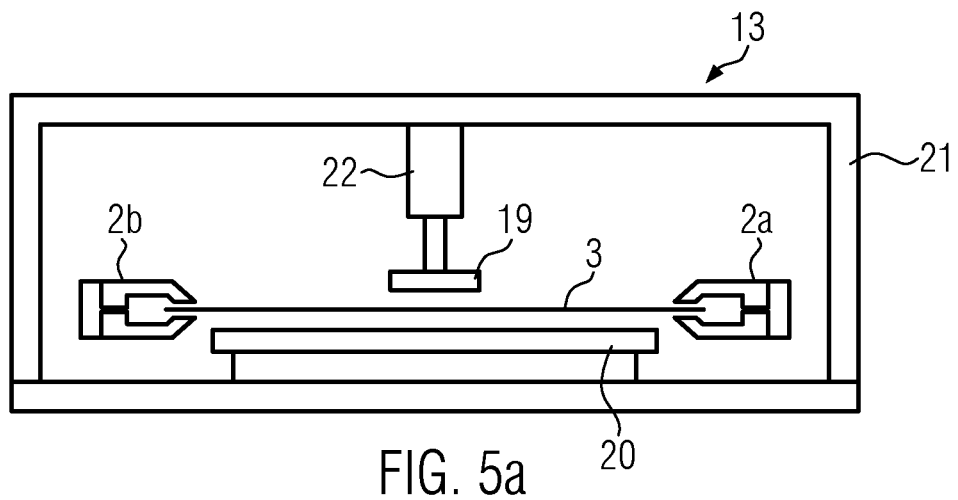
FIG. 5a is a schematic section view of the thermoform packaging machine according to FIG. 1 and FIG. 3 cut along the line A-A showing an embodiment of a pulling device.
Figure 5B:
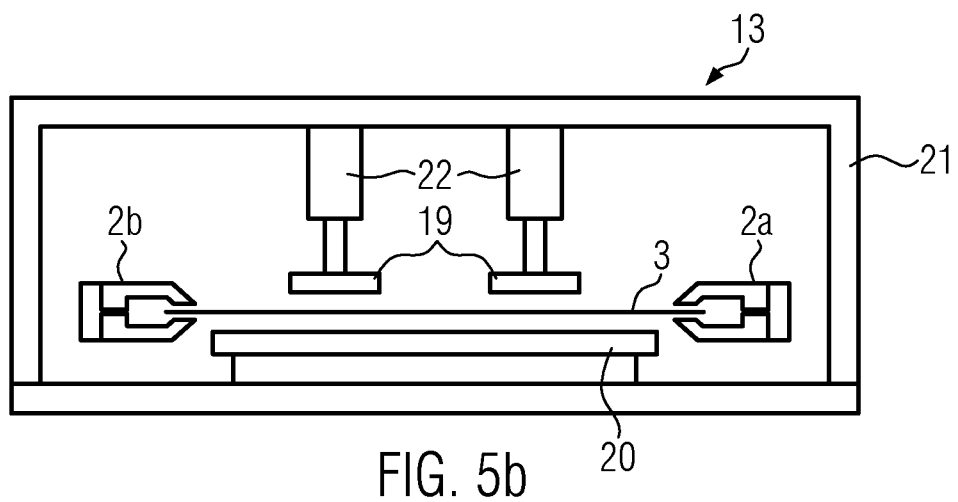
FIG. 5b is a schematic section view of the thermoform packaging machine according to FIG. 4 cut along the line B-B showing an embodiment of a pulling device.
Figure 5C:
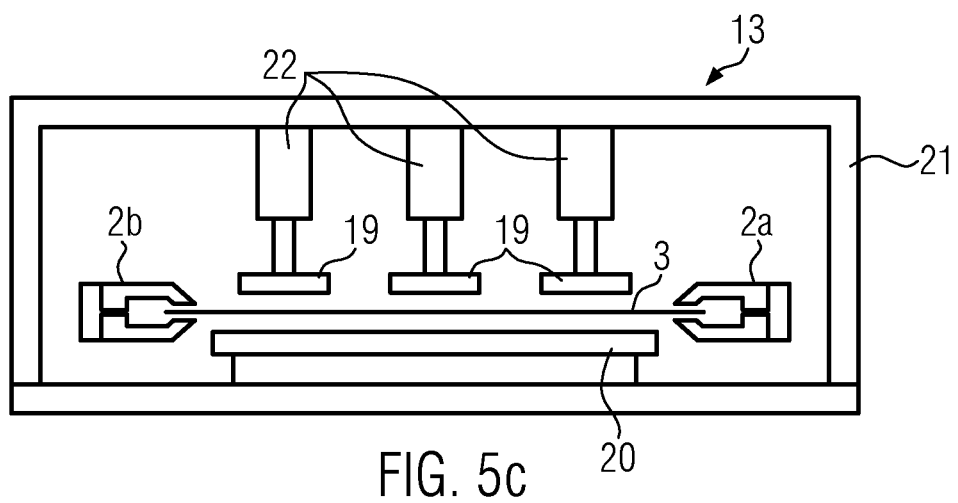
FIG. 5c is a schematic section view of the thermoform packaging machine according to showing an embodiment of a pulling device that is a variation of the embodiments shown in FIGS. 5a and 5b.

In FIGS. 5a to 5c various embodiments of pulling devices 13 are shown. The figures show a front view. The perspective is identified by the arrows A-A in FIGS. 1 and 3 and by the arrows B-B in FIG. 4. The pulling devices shown in FIGS. 5a to 5c mainly differ in that different numbers of clamping elements 19 are provided. For the sake of clarity, only the bottom film 3 is shown in FIGS. 5a to 5c.

In addition to the one or the plurality of clamping elements 19, the pulling device 13 comprises a counter-pressure bar 20. The clamping elements 19 can be pressed against this counter-pressure bar 20. In order to connect the counter-pressure bar 20 with the clamping element 19, a bridge- or portal-shaped structure 21 may be provided. For operating, i.e. pressing, the respective clamping elements 19 against the counter-pressure bar 20, clamping cylinders 22 may be provided. These clamping cylinders may be conventional hydraulic or pneumatic cylinders. The prefix "clamping" is only used for differentiating more easily between various cylinders.

In order to compensate for a distortion between the lateral edges 16a, 16b and the pull section 15, the clamping element 19 is pressed against the counter-pressure bar 20 by operating the clamping cylinder 22. Thereby, the top film 9 and the bottom film 3 are clamped between the clamping element 19 and the counter-pressure bar 20. By displacing the structure 21 and, consequently, the clamping element 22 as well as the counter-pressure bar 20, a distortion can be compensated. In order to increase the friction between the clamping element 19 and the top film 9, the clamping element may have a coating provided thereon, for example, a silicone coating. The counter-pressure bar 20 may as well have a coating provided thereon, for example, a silicone coating, for increasing the friction with the bottom film 3. Since the displacement for compensating the distortion takes place in the direction of production P and since the perspective shown in FIGS. 5a to 5c is directed in the direction of production P as well, components of the pulling device 13 which serve the purpose of displacement will be explained with reference to FIGS. 6a to 6c.

Figure 6A:
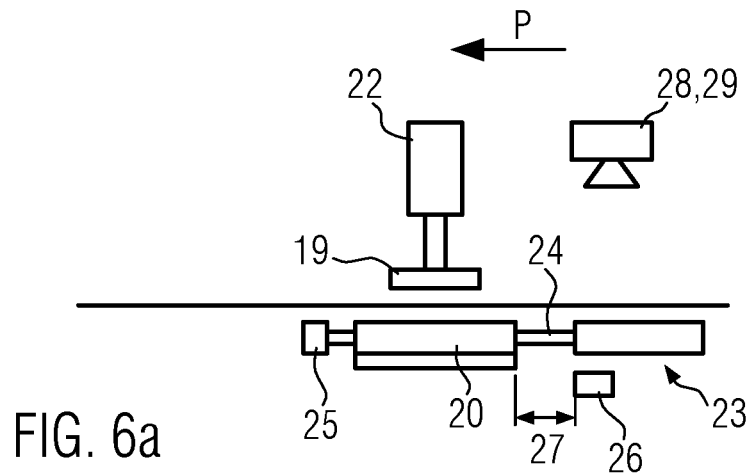
FIG. 6a is a schematic side view of an embodiment of a pulling device and a film distortion sensor in accordance with the teachings of the present disclosure.
Figure 6B:
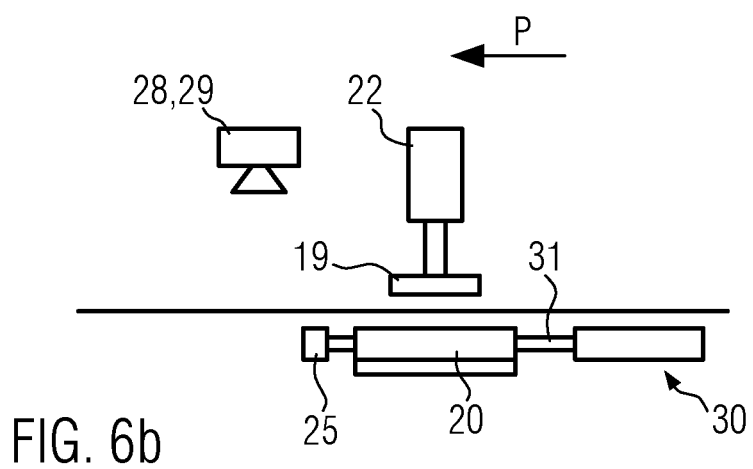
FIG. 6b is a schematic side view of an embodiment of a pulling device and a film distortion sensor in accordance with the teachings of the present disclosure.
Figure 6C:
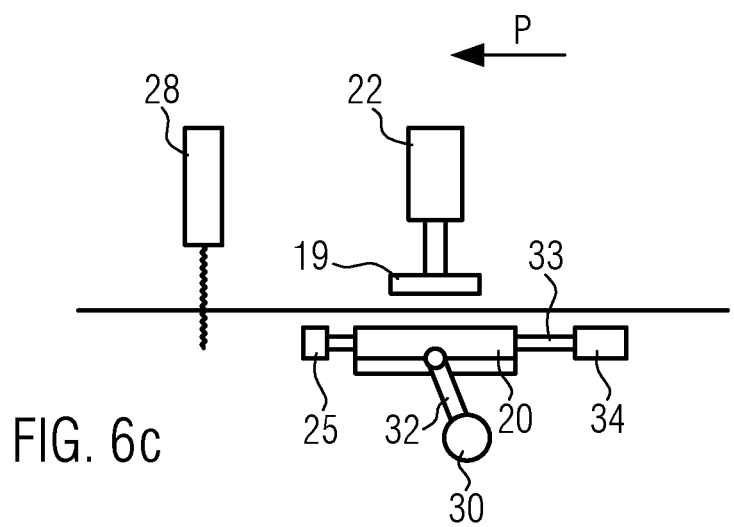
FIG. 6c is a schematic side view of an embodiment of a pulling device and a film distortion sensor in accordance with the teachings of the present disclosure.

For the sake of clarity, some components, such as the structure 21 and the clamp chains 2a, 2b, are not shown in FIGS. 6a to 6c. The top film 9 and the troughs 5 are not shown either. The components shown in each of the three figures are the clamping element 19, the clamping cylinder 22 provided for actuating the latter, and the counter-pressure bar 20. For displacing the counter-pressure bar 20 and thus also the clamping element 19, a displacement cylinder 23 is provided in FIG. 6a. This may be a conventional hydraulic or pneumatic cylinder. Similar to the use in the case of the clamping cylinder 22, the prefix "displacement" is only used for making the cylinders more easily distinguishable. A piston rod 24 of the displacement cylinder 23 is connected to the counter-pressure bar 20 or the structure 21. This has the effect that the counter-pressure bar 20 will be displaced in the direction of production P, when pressure is applied to the piston side of the displacement cylinder 23. For limiting the displacement, a stop 25 may be provided. Alternatively or additionally to a stop 25, the displacement may be controllable by closed loop control of the extension of the displacement cylinder 23. To this end, a distance sensor 26 may be provided, which detects a displacement distance 27. On the basis of the displacement distance detected, the displacement of the counter-pressure bar 20 can be controlled. The distance sensor 26 may be based on any principle of distance measurement, for example, on a transit time measurement of ultrasonic or laser signals.

Additionally or alternatively, a distortion sensor 28 may be provided. As shown in FIGS. 6a and 6b, this sensor may be a camera 29. This camera 29 may detect the position and/or the shape of the webs 17 between the troughs 5 and identify on the basis thereof a displacement between the lateral edges 16a, 16b and the pull section 15. The desired corrected arrangement of the pull section 15 can be detected by a camera 29 as well. As has already been indicated, a combination of the distance sensor 26 and the distortion sensor 28 or camera 29 may also be provided. As can be seen in FIG. 6a, the camera 29 may be arranged upstream of the clamping element 19 and, consequently, upstream of the pulling device 13. The person skilled in the art will immediately recognize that the camera 29 may be mounted on the structure 21 as well as on other structures of the thermoform packaging machine 1, which do not move together with the structure 21. This last-mentioned configuration should be slightly preferred.

An alternative embodiment of the displacement mechanism is shown in FIG. 6b. An alternative arrangement of the camera 29, namely downstream of the pulling device and the clamping element 19, is also shown. For displacing the counter-pressure bar 20, a motor 30 is provided. This motor 30 may be a stepping motor or a servomotor. The rotary movement of the motor 30 can be converted into a linear movement of the counter-pressure bar 20 by a spindle 31. To this end, it will suffice to provide a nut, for example a recirculating ball nut, which is secured to the counter-pressure bar 20.

A further alternative embodiment of a displacement mechanism is shown in FIG. 6c. A motor 30 is used in this case as well. However, for converting the rotary movement of the latter into a linear movement, a crank 32 is provided. This crank 32 is connected to the counter-pressure bar 20. The latter is guided on a linear guide 33. A linear guide may be provided in all the embodiments described.

In addition to the stop 25, a second stop 34 may be provided, which limits the displacement distance in a direction opposite to the direction of production P. The distortion sensor 28 shown in this embodiment is not a camera. It may be a sensor, which is based on optical principles, laser or infrared, or on acoustic principles, for example, ultrasound. Similar to the camera, it may be arranged downstream of the clamping element 19, as shown in FIG. 6c. However, an arrangement upstream of the clamping element 19 is conceivable as well.

The use of a motor 30 for the purpose of displacement has the advantage that conclusions about the displacement distance 27 can be drawn from the rotary position of the motor 30 and/or the number of revolutions. Such a determination of the displacement distance 27 may be provided alternatively or additionally to a distance sensor 26.

Figure 7:
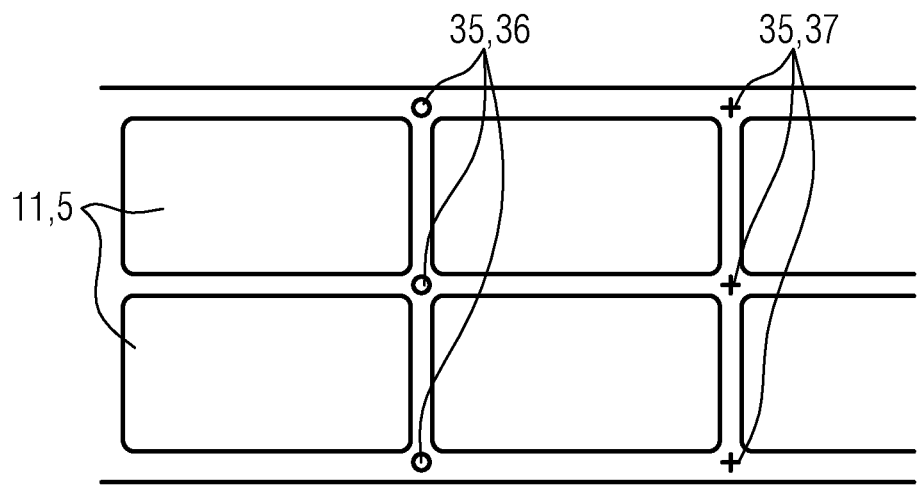
FIG. 7 is a schematic top view of an embodiment of a film with troughs and reference elements for use in a thermoforming packaging machine in accordance with the teachings of the present disclosure.

In combination with all the above described distortion sensors 28, reference elements 35 may be provided on and/or in the bottom film 3 and/or the top film 9. As is exemplarily shown in FIG. 7, these reference elements may be holes 36 and/or print marks 37. These holes and/or print marks may be of advantage when detection is accomplished by simple distortion sensors 28, as shown in FIG. 6c, as well as in combination with cameras 29, as shown in FIGS. 6a and 6b.

Figure 8:
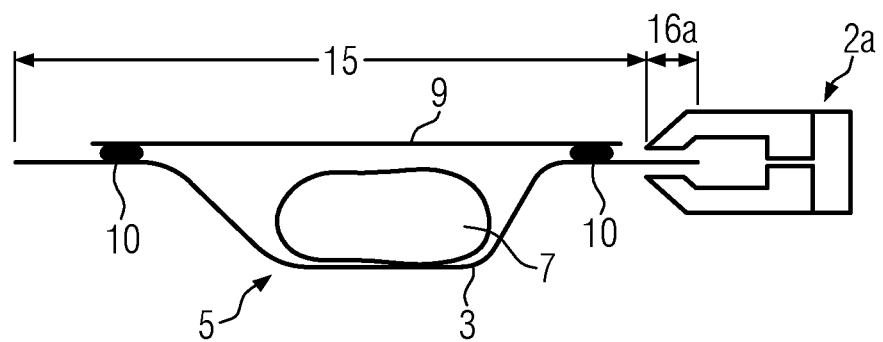
FIG. 8 is a schematic section view of the thermoform packaging machine according to FIG. 2 except it illustrates an embodiment in which only one clamp chain is used.

As has already been indicated before, the invention is also applicable to thermoform packaging machines 1 in which only one clamp chain 2a is provided. In this case, the pull section 15 extends, as shown in FIG. 8, outside the lateral edge 16a, which is held by the clamp chain 2a, up to the ends of the top film 9 and of the bottom film 3 located opposite the lateral edge 16a.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A thermoform packaging machine comprising:
    a forming station;
    a sealing station;
    a cutting station;
    a film conveying unit, wherein the film conveying unit includes a clamp chain arranged on a lateral edge of a bottom film for cyclically conveying the bottom film in a direction of production, the bottom film being advanced in each cycle by one cycle length; and
    a pulling device capable to pull a pull section of the bottom film and a top film relative to the lateral edge of the bottom film held by the clamp chain in a direction parallel to the direction of production.

2. The thermoform packaging machine according to claim 1, wherein the pulling device is arranged upstream of one of the sealing station or the cutting station a maximum of a distance of two cycle lengths.

3. The thermoform packaging machine according to claim 1, wherein the pull section of the bottom film and/or of the top film extends outside the lateral edge of the bottom film held by the clamp chain to a second lateral edge of said bottom film.

4. The thermoform packaging machine according to claim 1, wherein the clamp chain is a first clamp chain, and the lateral edge of the bottom film is a first lateral edge of the bottom film, the thermoform packaging machine further comprising a second clamp chain arranged on a second lateral edge of the bottom film for cyclically conveying the bottom film in a direction of production, wherein the pulling device pulls the pull section of the bottom film and the top film, wherein the pull section of the bottom film and the top film extends between the first lateral edge and the second lateral edge of the bottom film.

5. The thermoform packaging machine according to claim 1, wherein the pulling device comprises a clamping element and a counter-pressure bar, the clamping element being disposed for movement to press against the counter-pressure bar.

6. The thermoform packaging machine according to claim 5, wherein the clamping element comprises a silicone coating.

7. The thermoform packaging machine according to claim 5, wherein the clamping element and the counter-pressure bar are moveable between a first position and a second position in a direction parallel to the direction of production, wherein the first position and the second position are separated by a displacement distance.

8. The thermoform packaging machine according to claim 7, wherein the clamping element and the counter-pressure bar are moved between the first position and the second position using a pneumatically or hydraulically operated displacement cylinder.

9. The thermoform packaging machine according to claim 7, wherein the clamping element and the counter-pressure bar are moved between the first position and the second position using a stepping motor or a servomotor.

10. The thermoform packaging machine according to claim 7, further comprising a distance sensor for detecting the displacement distance.

11. The thermoform packaging machine according to claim 10, wherein the displacement distance is controllable on the basis of the displacement distance detected by the distance sensor.

12. The thermoform packaging machine according to claim 7, wherein the displacement distance is controllable.

13. The thermoform packaging machine according to claim 7, further comprising a stop for limiting the displacement distance.

14. The thermoform packaging machine according to claim 5, wherein a position of the clamping element is adjustable in a direction perpendicular to the direction of production and in a direction parallel to a conveying plane of the bottom film.

15. The thermoform packaging machine according to claim 5, wherein the pulling device comprises a plurality of clamping elements, a position of each of the plurality of clamping elements being adjustable in a direction perpendicular to the direction of production and in a direction parallel to a conveying plane of the bottom film.

16. The thermoform packaging machine according to claim 5, wherein the counter pressure bar has a longitudinal axis that extends in a direction perpendicular to the direction of production.

17. The thermoform packaging machine according to claim 1 further comprising a film distortion sensor for detecting a distortion of the pull section of one of the bottom film or a top film relative to the lateral edge of the bottom film held by the clamp chain.

18. The thermoform packaging machine according to claim 1, wherein the pulling device is controlled for pulling between advancing phases of two cycles.

19. The thermoform packaging machine according to claim 1, wherein said pull section is interior of the lateral edge of the bottom film.

20. A thermoform packaging machine comprising:
a forming station;
a sealing station;
a cutting station;
a film conveying unit, wherein the film conveying unit includes a clamp chain arranged on a lateral edge of a bottom film for cyclically conveying the bottom film in a direction of production, the bottom film being advanced in each cycle by one cycle length; and
a pulling device capable to pull a pull section of one of the bottom film or a top film relative to the lateral edge of the bottom film held by the clamp chain in a direction parallel to the direction of production;
wherein the pulling device comprises a clamping element and a counter-pressure bar, the clamping element being disposed for movement to press against the counter-pressure bar; and
wherein the clamping element and the counter-pressure bar are moveable between a first position and a second position in a direction parallel to the direction of production, wherein the first position and the second position are separated by a displacement distance.

21. A thermoform packaging machine comprising:
a forming station;
a sealing station;
a cutting station;
a film conveying unit, wherein the film conveying unit includes at least one clamp chain that grips a lateral edge of a bottom film for cyclically conveying the bottom film through one or more stations of the thermoform packaging machine in a direction of production, the bottom film being advanced in each cycle by one cycle length; and
a pulling device comprising a clamping element and a counter-pressure bar, the counter-pressure bar disposed underneath a pulling section of one of said bottom film or a top film, and wherein the clamping element and the counter-pressure bar are capable to clamp and pull at least a portion of a pull section of one of the bottom film or the top film in a direction parallel to the direction of production and relative to the lateral edge of the bottom film held by the at least one clamp chain, and wherein said pull section is disposed within a width of the bottom film and interior of said lateral edge of said bottom film.

* * * * *